United States Patent [19]

Redl et al.

[11] 4,182,228
[45] Jan. 8, 1980

[54] APPARATUS FOR THE PRODUCTION OF MASH

[75] Inventors: Simon Redl, Reichertshausen; Johann Mooser, Freising, both of Fed. Rep. of Germany

[73] Assignee: Anton Steinecker Maschinenfabrik GmbH, Freising, Fed. Rep. of Germany

[21] Appl. No.: 927,420

[22] Filed: Jul. 24, 1978

[30] Foreign Application Priority Data

Aug. 30, 1977 [DE] Fed. Rep. of Germany ....... 2739049
Mar. 1, 1978 [DE] Fed. Rep. of Germany ....... 2808712

[51] Int. Cl.² ............................ C12C 7/08; C12C 5/00
[52] U.S. Cl. .................................................. 99/276
[58] Field of Search ............. 99/275, 276, 277, 277.1, 99/277.2, 278; 366/71; 137/592, 262; 195/69, 70, 71, 128, 132, 133, 138, 139

[56] References Cited

U.S. PATENT DOCUMENTS

| | | | |
|---|---|---|---|
| 2,073,567 | 3/1937 | Sciarra | 366/71 |
| 2,508,762 | 5/1950 | Lapple | 137/262 |
| 3,327,612 | 6/1967 | Lenz | 99/278 |
| 3,338,152 | 8/1967 | Lenz | 99/278 |
| 3,585,045 | 6/1971 | Lenz | 99/276 |

*Primary Examiner*—Robert W. Jenkins
*Attorney, Agent, or Firm*—Learman & McCulloch

[57] ABSTRACT

Apparatus for the production of mash comprising a walled housing having at its lower end a walled chamber for the reception of brewing malt and water. Wet malt is introduced to the chamber via crushing rollers and water is introduced to the chamber over substantially its entire periphery by means of guides which deliver the water in a coherent film onto the surface of mash in the chamber.

19 Claims, 7 Drawing Figures

APPARATUS FOR THE PRODUCTION OF MASH

This invention relates to an apparatus for the production of mash, comprising crushing rollers for the wet-crushing of brewing malt, a water supply means and a chamber partly filled with mash arranged below the crushing rollers and provided with a stirrer for mixing the crushed malt with the water.

In one known apparatus of the kind mentioned above, the water supply means consists of a single pipe which opens freely at a distance above the surface of the mash and from which the water issues in the form of a fairly powerful jet. In view of the considerable length of this apparatus for the production of mash containing the crushing rollers for wet-crushing the brewing malt, the addition of water at a single point of the mash chamber is relatively unfavorable and complicates homogenization of the water with the crushed malt.

In other known apparatus developed with a view to obtaining more rapid mixing, a nozzle system extends substantially over the entire axial length of the crushing rollers, spraying water either horizontally or obliquely downwards from a plurality of nozzle orifices. The principal disadvantage attending apparatus of this type is that the water issuing from the nozzles in relatively fine distribution becomes heavily enriched with air before it enters the mash. However, the presence of this air causes the wort to darken in colour and is highly undesirable for reasons of quality.

This disadvantage of the presence of air in the water added is also encountered in another known apparatus in which the water issues from spray tubes partly horizontally and partly upwards towards the crushing rollers. In addition, this apparatus is attended by the further disadvantage that, under certain conditions, the film of water arriving on the crushing rollers covers the fluting of the crushing rollers and hence prevents the malt from being satisfactorily drawn into the gap between the rollers.

The object of the present invention is to obviate the disadvantages of conventional apparatus by providing apparatus in which the water is introduced into the mash on the one hand in as uniform a distribution as possible, but on the other hand with as little enrichment with air as possible.

According to the invention, this object is achieved in that the water supply means comprises a section for producing a coherent film of water and a guide surface for guiding the film of water onto the surface of the mash.

According to the invention, therefore, one or more coherent films of water are produced, preferably extending over substantially the entire axial length of the crushing rollers. In this way, the water enters the mash in highly uniform, fine distribution which ensures rapid homogenisation of the water and the crushed malt. The important factor in this respect is above all that the film of water is guided onto the surface of the mash in a form which largely prevents the water from becoming heavily enriched with air. This is because, by virtue of the fact that the film of water is guided onto the surface of the mash by a guide surface, the water surface exposed to air is on the one hand considerably reduced (by comparison with the spraying of water through nozzles), whilst on the other hand minimal surface renewal occurs in the region of the water/air interface which is critical to the penetration of air. Extensive tests have shown that it is possible in this way largely to prevent air from entering the water despite its uniform, fine distribution.

The guide surface is best continued up to the surface of the mash (in the normal operational stage of the apparatus) or to slightly below that surface. However, it is also possible in accordance with the invention to allow the guide surface to terminate at a certain, but not excessive, distance above the surface of the mash. Tests have shown that a uniformaly produced film of water extending over the entire axial length of the apparatus remains intact without becoming significantly enriched with air, even over a certain free fall.

In one practical embodiment of the apparatus according to the invention, at least part of the water supply means is provided in the vicinity of the end walls arranged transversely of the axes of the crushing rollers, these end walls forming the guide surfaces guiding the film of water onto the surface of the mash in that vicinity.

In this way, accumulations of material forming in the vicinity of these end walls are immediately broken up by the film of water produced and introduced with it into the mash. If in this way a film of water is produced in the region of all four sides of the housing chamber, not only does the water enter the mash in very fine distribution and without any significant inclusion of air, but any accumulations and deposits of material on the walls of the housing above the mash level are also eliminated.

Accordingly, the apparatus according to the invention is distinguished by the high quality of the mash produced and by its particularly reliable, disturbance-free operation.

Practical embodiments of the invention are illustrated in the following description and the accompanying drawings, wherein.

Figure 3:
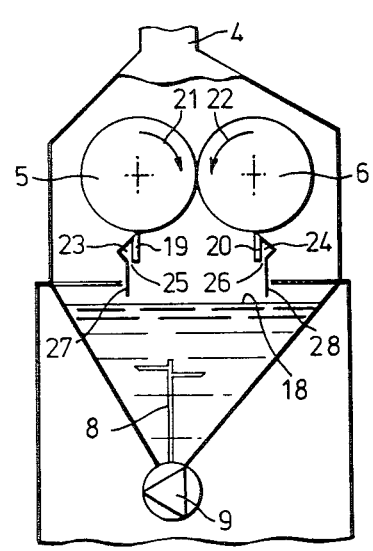

FIG. 3 diagrammatically illustrates another embodiment of the invention.

Figure 4:
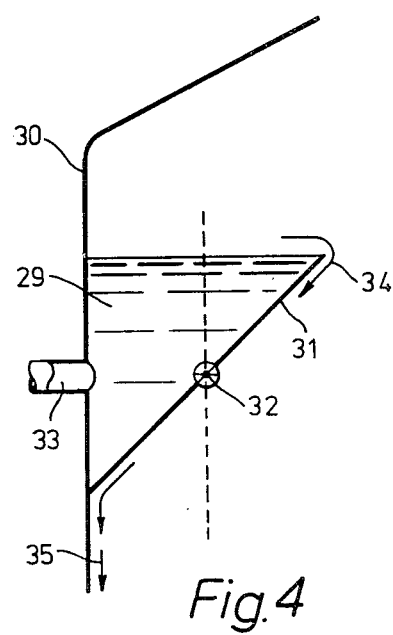

FIG. 4 is a partial elevation of a third embodiment.

Figure 5:
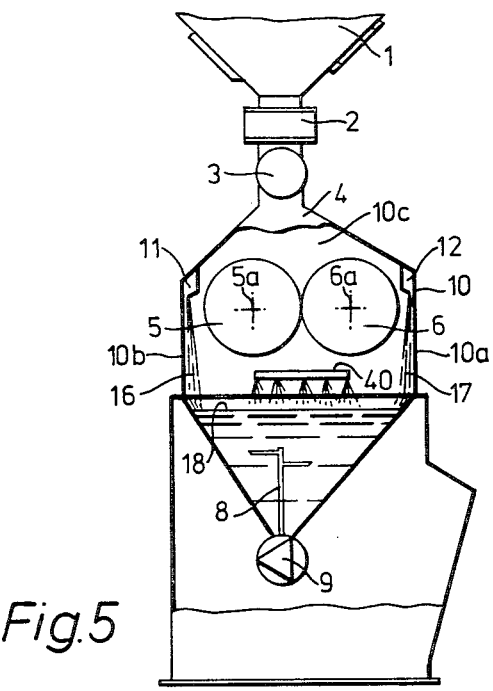

FIG. 5 is a section through another embodiment of apparatus according to the invention.

Figure 6:
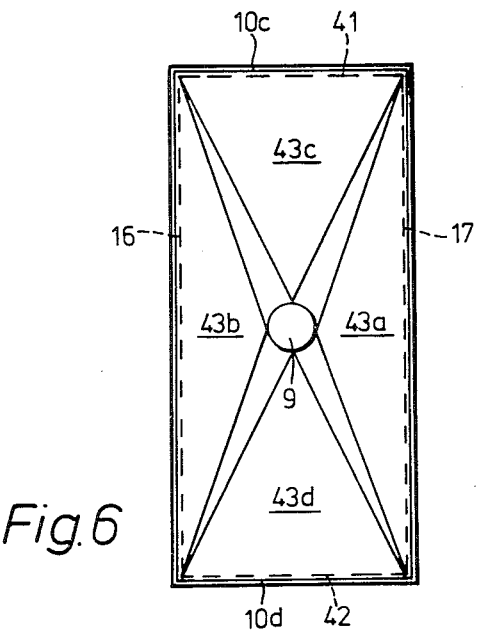

FIG. 6 is a diagrammatic plan view of the funnel-shaped base of the housing chamber of the apparatus shown in FIG. 5.

Figure 7:
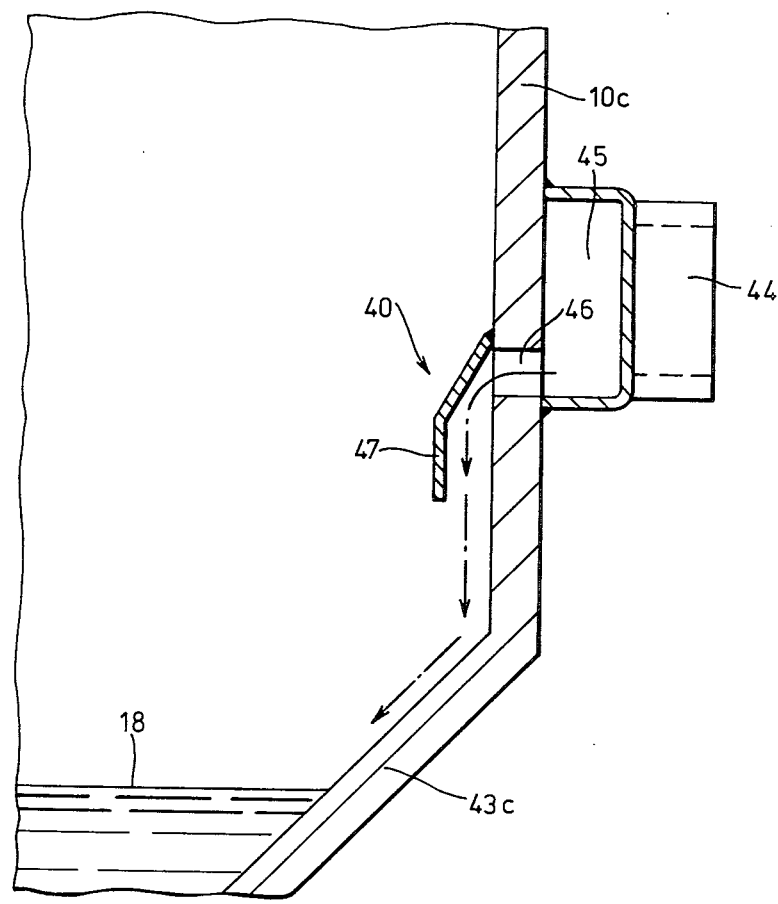

FIG. 7 is a partial section through the water supply means in the region of one end of the embodiment shown in FIGS. 5 and 6.

Figure 1:
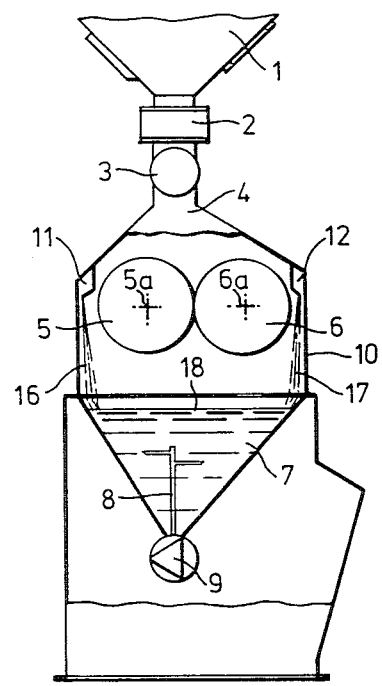
FIG. 1 is a diagrammatic vertical section through one embodiment of apparatus according to the invention for the production of mash.
Figure 2:
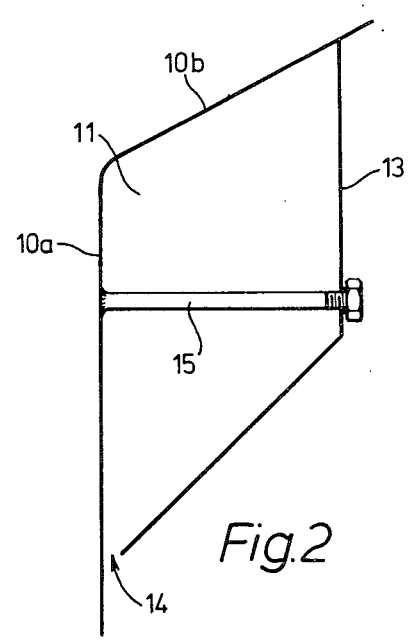
FIG. 2 is a partial elevation of FIG. 1 on a larger scale.

FIGS. 1 and 2 show, as a first embodiment of the invention, an apparatus for the production of mash comprising a steeping tank 1, a feed pipe 4 provided with a shut-off slide 2 and a rotary feeder 3, two crushing rollers 5 and 6 and a walled chamber 7 equipped with a stirrer 8 for homogenising the water and the crushed malt. The mash is removed by a pump 9.

The walled housing 10 accommodating the crushing rollers 5, 6 and the chamber 7 is provided in the vicinity of both end walls running parallel to the axes 5a and 6a of the crushing rollers 5, 6 with two water pockets 11, 12 of which the water pocket 11 is shown enlarged in FIG. 2.

This water pocket 11 extends over the entire axial length of the housing 10 and is limited at its ends by the two end walls of the housing 10. Elsewhere the water pocket 11 is limited on the one hand by the housing walls 10a, 10b and on the other hand by a wall 13 which, together with the housing wall 10a, forms a water outlet slot 14 in the lower part of the water pocket 11. This slot, which thus extends over the entire axial length of the housing 10, best has a gap width of 0.5 to 5 mm and preferably from 1.5 to 3 mm.

For keeping the width of the gap constant over the entire axial length of the slot 14, the walls 10a and 13 are joined together at certain intervals by spacer elements 15. These spacer elements 15 may either be rigid (non-adjustable) or designed for adjustment (for example by means of screws and threads) so that the width of the slot 14 may be adjusted.

A water connection (not shown) is provided near each end of the water pocket 11.

As can be seen from FIGS. 1 and 2, the brewing water required for producing the mash is delivered in operation from the two water pockets 11 and 12 in the form of separate films 16 and 17 which run downwards on the two end walls of the housing 10 and enter the mash (surface 18) in the region of the chamber 7.

In the embodiment shown in FIGS. 1 and 2, therefore, the two end walls of the housing form the guide surfaces which guide the film of water onto the surface of the mash. This embodiment not only has the advantage of particular simplicity, but also the advantage that the inner surfaces of the housing are continuously cleaned. In this way, particles of malt, chaff or other solids which are thrown outwards onto the walls of the housing during the rotation of the rollers are entrained downwards by the film of water running down the side walls of the housing and are therefore unable to settle on the walls of the housing. In order fully to utilize this cleaning effect of the downwardly flowing film of water, the water pockets 11 and 12 are best arranged at such a height that their outlet slot (for example 14) lies no lower than, and preferably above, the plane of the crushing roller axes 5a, 6a.

In the embodiment of the invention shown in FIG. 3, two fixed strippers 19, 20 are arranged opposite the periphery of the crushing rollers 5 and 6 in the lower peripheral zone thereof, a pocket 23, 24 producing the film of water being provided on the rear side (in the direction of rotation indicated by the arrows 21, 22) of each stripper 23, 24. At their lower ends, the pockets 23, 24 comprise slots 25, 26 which also extend over the entire axial length of the apparatus. The strippers 19, 20 are extended downwards by plates 27 and 28 which form guide surfaces guiding the film of water onto the surface 18 of the mash.

Whereas in the example of embodiment shown in FIGS. 1 and 2, the guide surfaces (side housing walls) extend below the surface of the mash, the plates 27, 28 forming the guide surfaces in the embodiment shown in FIG. 3 terminate just above the surface 18.

FIG. 4 shows another embodiment of the invention in which that part of the water supply means which produces the film of water is formed by a channel 29 in the form of an overflow barrier. In the embodiment illustrated, this channel 29 is formed by the side wall 30 of the housing and a plate 31 which is pivotal about its longitudinal axis 32. The channel 29, which again extends over the entire axial length of the housing, is provided with one or more water connections 33.

The water issues from the channel 29 in the form of an overflow (arrow 34) and then flows in the form of a coherent film of water along the lower surface of the plate 31 and then downwards along the inner surface of the housing wall 30 (arrow 35).

The above-mentioned pivotability of the plate 31 about its axis 32 makes the channel easier to clean and even provides for automatic cleaning. To this end, the position of the axis 32 and the water connection(s) 33 may be selected in such a way that, when the water supply is open and the channel full, the plate 31 is held by the pressure of the water in the position in which it closes the channel, as indicated by solid lines in FIG. 4, whereas when the water supply is interrupted the plate moves into a position in which it opens the channel, as indicated by chain lines in FIG. 4.

The apparatus for the production of mash which is shown as another embodiment in FIGS. 5 to 7 comprises a steeping tank 1, a feed pipe 4 provided with a shut-off slide 2 and a rotary feeder 3, two crushing rollers 5 and 6 and a chamber 7 provided with a stirrer 8 for homogenising the water and the crushed malt. The mash is removed by a pump 9.

The housing 10 accommodating the crushing rollers 5, 6 and the chamber 7 is provided in the vicinity of the two side walls 10a, 10b running parallel to the axes 5a, 6a of the crushing rollers 5, 6 with two water pockets 11, 12 which extend over the entire axial length of the housing 10 and from which separate films of water 16, 17 issue downwards. These two films of water 16, 17 are introduced by the side walls 10a, 10b of the housing acting as guide surfaces into the mash (surface 18).

In addition, water supply means are provided in the vicinity of the end walls 10c, 10d of the housing 10 which extend transversely of the axes 5a, 6a of the crushing rollers 5, 6. In the vicinity of these two end walls 10c, 10d, they each produce a film of water 41, 42 (cf. the diagrammatic illustration in FIG. 6) by which accumulations of material possibly forming in the region of these end walls 10c, 10d are broken up and flushed into the mash bath.

As can be seen from FIG. 5 in particular, the water supply means 40 provided in the vicinity of the two end walls are arranged substantially centrally below the nip between the crushing rollers 5 and 6. Accordingly, the water supply means 40 extend to both sides from a vertical plane extending through the nip between the crushing rollers. In this way, the film of water produced by these water supply means in the region of both end walls covers above all those zones where a troublesome accumulation of material would be likely to form in the absence of the water supply means.

FIG. 6 shows the hopper-like base of the chamber 7 delimited by four oblique surfaces 43a, 43b, 43c, 43d. Accordingly, all four sides of the chamber 7 containing the mash are supplied and washed uniformly and in fine distribution with water by the films of water 16, 17, 41, 42 produced by the various water supply means.

FIG. 7 shows one embodiment for the construction of the water supply means 40. On the outside of the end wall 10c, there is a water chamber 45 provided with a water inlet 44 which communicates through a slot-like opening 46 with the interior of the housing. The water delivered through this opening 46 is guided downwards by a baffle 47 and then impinges on the inclined surface 43c of the base of the chamber. The film of water is introduced into the mash (surface 18) along this sloping surface 43c acting as a guide surface, any accumulations of material, particularly on the sloping surface 43c above the mash level, being flushed away and introduced into the mash bath.

We claim:

1. Apparatus for the production of mash comprising a walled housing forming at its lower end a walled chamber for the accommodation of brewing malt and water; means for introducing brewing malt to said chamber; means for introducing water to said housing; and means for guiding water introduced to said housing into said chamber in a coherent film, said guiding means comprising a plate mounted for pivotal movement about an axis between a first position in which its lower end engages said housing wall to form with the latter a water-holding channel to a second position in which its lower end is spaced from said housing wall, said pivotal axis being located in such position that when said channel is full of water the weight of water maintains the lower end of said plate in engagement with said housing wall.

2. Apparatus for the production of mash comprising a walled housing forming at its lower end a walled chamber for the accommodation of brewing malt and water; crushing roller means mounted in said housing for rotation about parallel axes for introducing brewing malt to said chamber; stripping means in engagement with each of said rollers; means for introducing water to said housing; and means for guiding water introduced to said housing into said chamber in a coherent film, said guiding means comprising a plate adjacent each of said stripping means and forming with the latter a pocket having an outlet slot at its lower end.

3. Apparatus according to claim 2 wherein each of said plates is located on the trailing side of its associated stripping means with reference to the direction of rotation of the associated roller.

4. Apparatus for the production of mash comprising a walled housing forming at its lower end a walled chamber for the accommodation of brewing malt and water; means for introducing into said chamber brewing malt having its upper surface at a predetermined level; means for introducing water to said housing; and means for guiding water introduced to said housing into said chamber and onto the upper surface of said brewing malt in a coherent film.

5. Apparatus according to claim 4 wherein said guiding means extends over substantially the entire length of the chamber wall.

6. Apparatus according to claim 4 wherein said guiding means is formed in part by the housing wall.

7. Apparatus according to claim 4 wherein said guiding means comprises a plate forming with the chamber wall a pocket and having its lower end spaced from the chamber wall to form a slot.

8. Apparatus according to claim 7 wherein said water introducing means communicates with said pocket.

9. Apparatus according to claim 7 including means for spacing said plate from said chamber wall.

10. Apparatus according to claim 9 including means for adjusting said spacing means to vary the width of said slot.

11. Apparatus according to claim 4 wherein said guiding means comprises a plate and means mounting said plate for movement between a first position in which its lower end engages said housing wall to form with the latter a water-holding channel to a second position in which its lower end is spaced from said housing wall.

12. Apparatus according to claim 11 wherein said plate is mounted for movement about a pivotal axis.

13. Apparatus according to claim 12 wherein the pivotal axis of said plate is located in such position that when said channel is full of water the weight of water maintains the lower end of said plate in engagement with said housing wall.

14. Apparatus according to claim 4 wherein the means for introducing malt includes crushing rollers mounted in said housing for rotation about parallel axes.

15. Apparatus according to claim 14 wherein said guiding means establishes said film at a level no lower than that of the axes of said rollers.

16. Apparatus according to claim 14 including a stripper in engagement with each of said rollers, and wherein said guiding means comprises a plate adjacent each stripper and forming with the latter a pocket having an outlet slot at its lower end.

17. Apparatus according to claim 16 wherein each of said plates is located on the trailing side of its associated stripper with reference to the direction of rotation of the associated roller.

18. Apparatus according to claim 4 wherein said chamber has a hopper-like base formed by four inclined walls.

19. Apparatus according to claim 18 wherein said guiding means is formed at least in part by said inclined walls.

* * * * *